Aug. 7, 1945.          R. W. BROWN                 2,381,378
       FRICTION RETARDING MECHANISM FOR VEHICLE SUSPENSION
                    Filed Oct. 24, 1938        5 Sheets-Sheet 1

INVENTOR
Roy W. Brown
BY
ATTORNEYS

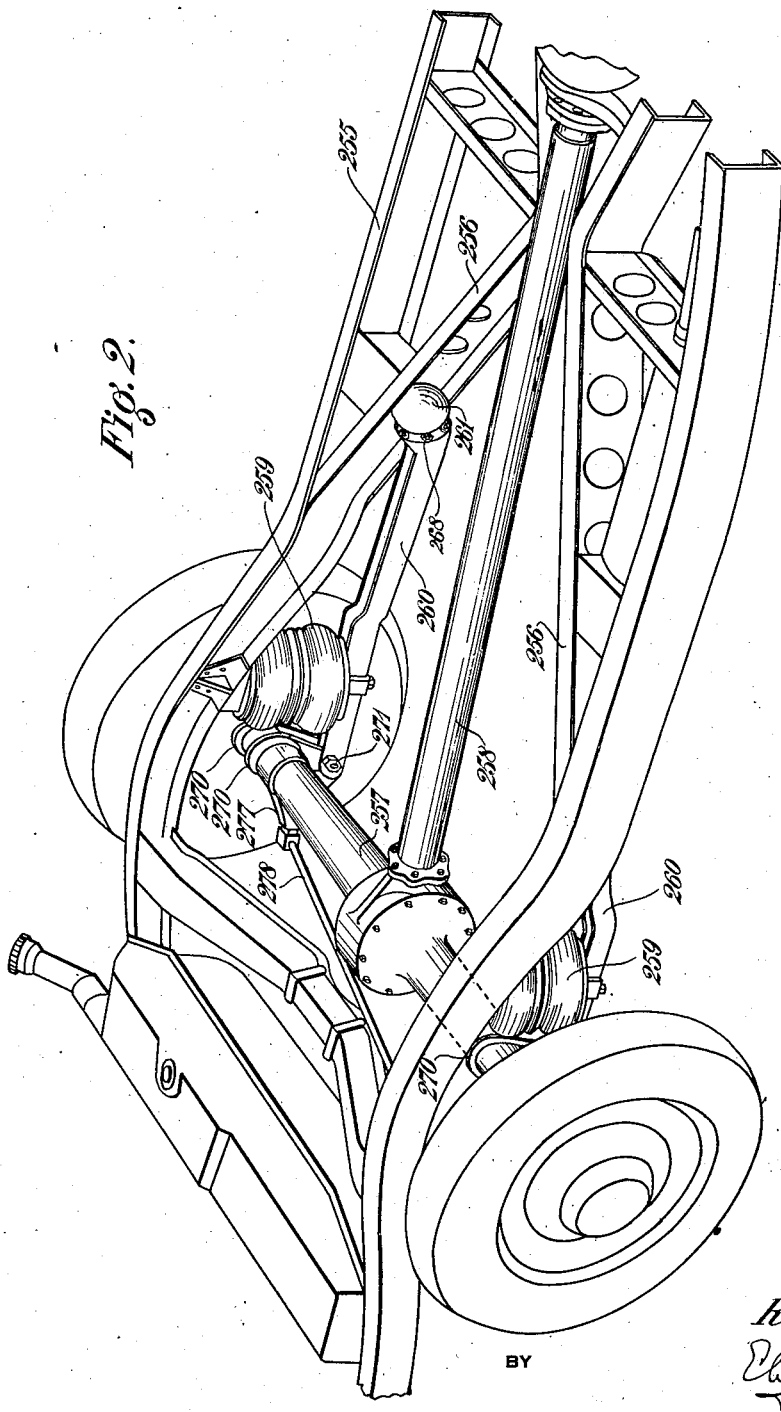

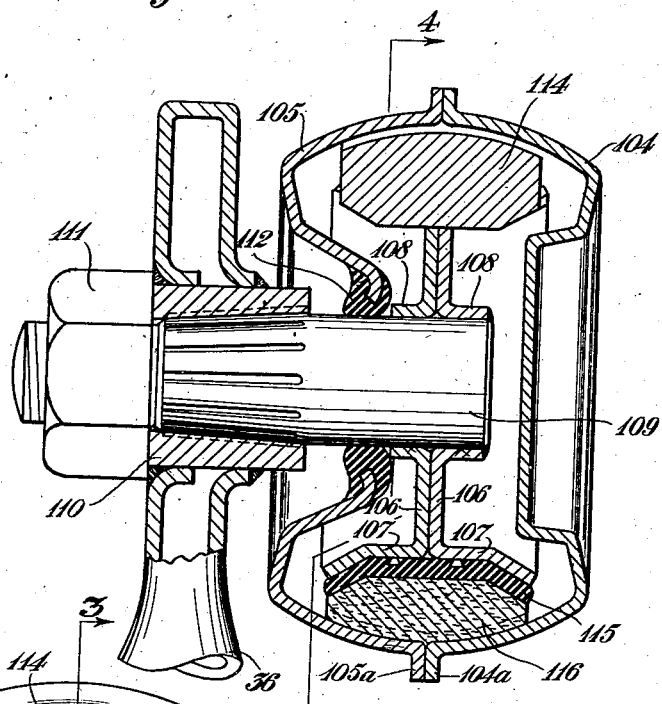
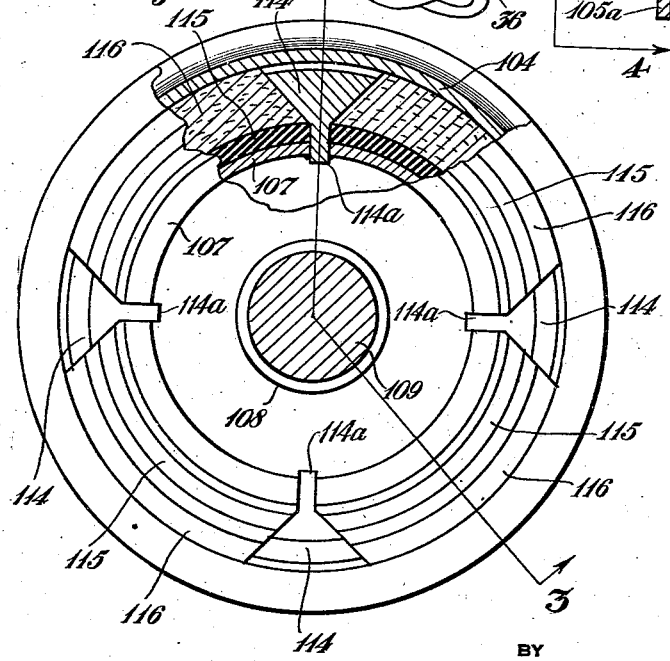

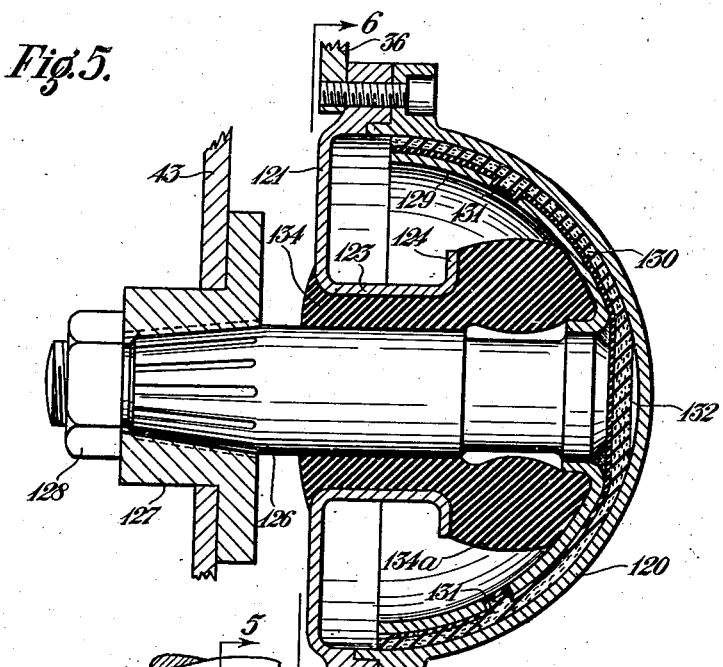
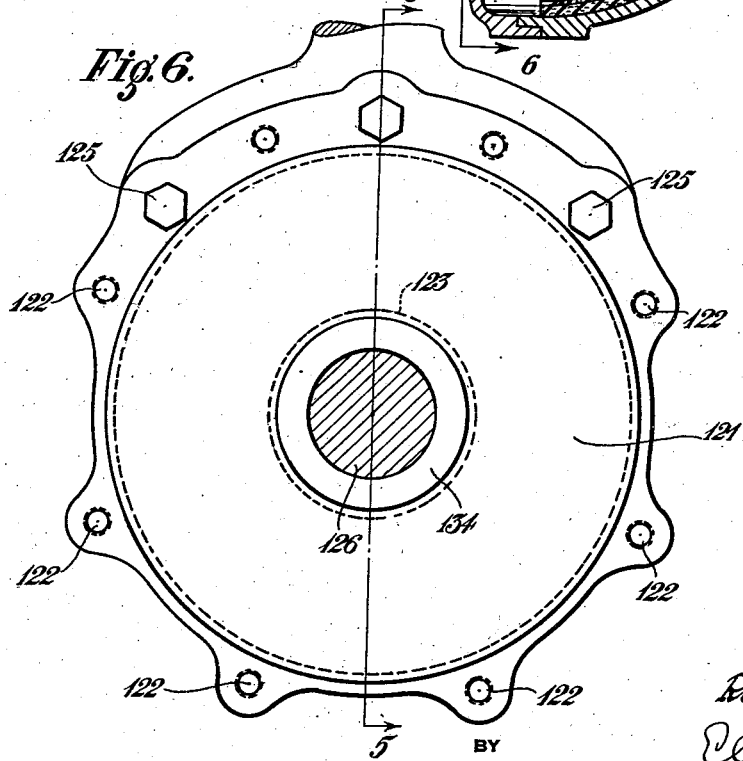

Aug. 7, 1945.   R. W. BROWN   2,381,378
FRICTION RETARDING MECHANISM FOR VEHICLE SUSPENSION
Filed Oct. 24, 1938   5 Sheets-Sheet 5
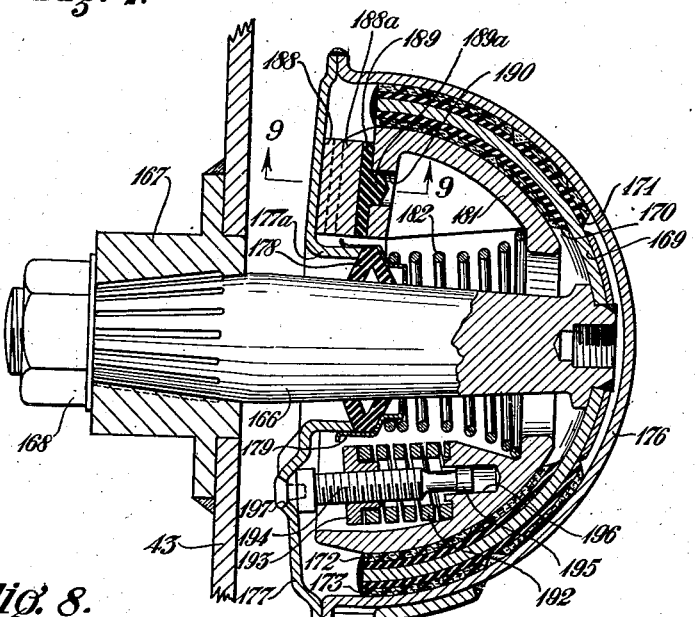
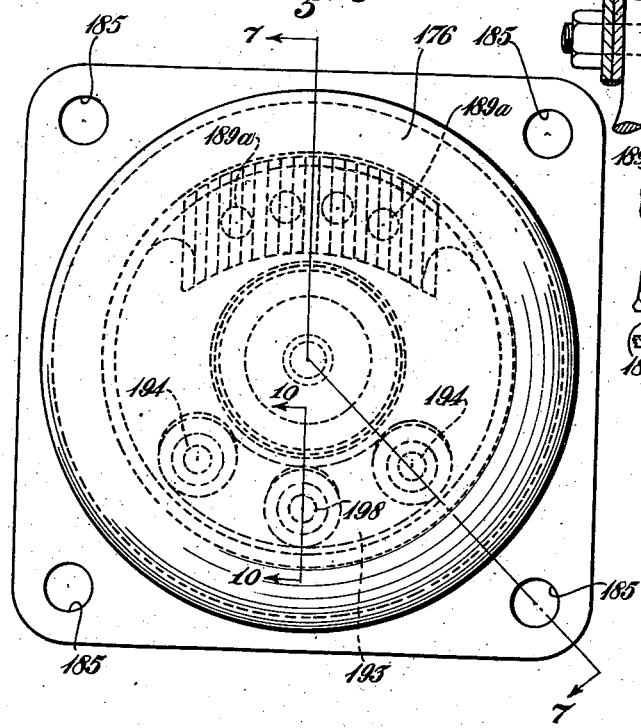
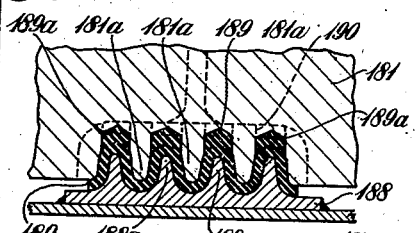
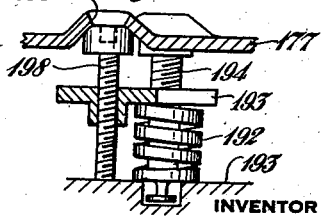
INVENTOR
Roy W. Brown
BY
ATTORNEYS Patented Aug. 7, 1945

2,381,378

UNITED STATES PATENT OFFICE 2,381,378

FRICTION RETARDING MECHANISM FOR VEHICLE SUSPENSION

Roy W. Brown, Akron, Ohio, assignor to The Firestone Tire & Rubber Company, Akron, Ohio, a corporation of Ohio Application October 24, 1938, Serial No. 236,693

11 Claims. (Cl. 188—130)

This invention relates to vehicle suspensions, and more especially it relates to improved mechanism interposed between the running gear and the frame or body of a vehicle for controlling movement of said running gear relatively of said frame or body, under actual operating conditions.

The invention is of primary utility in combination with resilient vehicle suspensions having no inherent friction and/or no lateral stability. Thus it may be used advantageously with coiled spring suspensions, or with pneumatic suspensions. It is the latter type of suspension that is employed in the illustrative embodiment of the invention herein depicted.

The advent of soft suspensions in modern motor vehicles, for the purpose of increasing riding comfort, has raised new problems for the reason that soft springs provide unstable suspensions, thus requiring the addition of some suitable stabilizing mechanism. Such means should produce low body frequency and low vertical accelerations of the body of the vehicle even when the running gear is subjected to high frequency shocks. Liquid shock absorbers provided for this purpose have been found unsuitable because of high viscous drag of the liquid. Furthermore, soft spring suspensions reduce the allowable variance in the friction of the suspension which will still produce an acceptable ride. Therefore it has been found desirable to eliminate, as nearly as is possible, all of the friction inherent in the suspension, and to provide friction-producing devices whereby the amount of friction and the frictional characteristics can be definitely controlled in the different types of suspensions, and under the different operating conditions that may be encountered.

One object of the invention is to provide means for maintaining the running gear and frame or body in certain relative fixed relation while permitting, but resiliently opposing, certain other relative movements.

Another object is to insulate the noise incident to the comparatively high frequency mechanical vibrations of the tires and running gear from the body or frame.

Another object is to provide means for resiliently opposing the tendency of the body to roll when the vehicle is driven through curves, without at the same time appreciably nullifying the advantages of the soft suspension.

Another object is to provide a vehicle suspension in which means are provided for resiliently supporting the body or frame on the running gear and in which separate means are provided for taking the thrust and torque reactions of the running gear, the latter means being connected with the running gear or frame through rubber connections in such a manner that the relative pivotal movements between the body and running gear along an axis generally longitudinal of the vehicle will be resiliently resisted without substantially affecting the rate of the suspension for relative straight vertical movements and while at the same time the noise from the tires and running gear will be effectively insulated from the frame or body.

Another object is to provide an improved vehicle suspension having a small amount of inherent friction, which is subject to large variations due to various operating conditions, and to provide an auxiliary device in which a controllable amount of friction may be provided to damp out oscillations between the running gear and frame or body.

A further object is to provide a friction device having a greater coefficient of kinetic friction than its coefficient of static friction.

The chief objects of the invention are to provide an improved vehicle suspension that will reduce the oscillations of the vehicle body about the center of gravity; that will reduce the tilting of the body during acceleration and deceleration; to provide a vehicle suspension in which the friction is controllable; to provide automatically for increasing the friction in the suspension upon acceleration or deceleration; and thereby to reduce or suppress oscillations normally arising from acceleration and deceleration; to provide a friction mechanism for the purpose mentioned that is universal in its ability to produce friction; that is, it will produce friction under all conditions of relative movement between the vehicle body and the running gear; to provide a vehicle suspension whereby stability of the body is maintained while at the same time maintaining the low rate of the suspension; to provide a vehicle suspension comprising a friction mechanism that will absorb torque and thrust reactions; and to provide a vehicle suspension having permanently lubricated friction mechanism between the body of the vehicle and the running gear, which friction mechanism has a greater coefficient of kinetic friction than its coefficient of static friction and a minimum of lost motion to the end that it is responsive even to the slightest relative movement of said body and running gear. Other objects will be manifest as the specification proceeds.

In accordance with the invention, friction-producing mechanism is operatively associated with thrust-translating devices that connect the body or frame of the vehicle with the running gear thereof, and which are subjected to various strains arising from relative movement of said body and running gear. Said connecting devices may be so arranged as to take the torque and braking reactions on the wheels in addition to the thrust, or they may be designed to take only the thrust. In either case by the association with said connecting devices of a friction device of the type susceptible to universal movement of the relatively moving parts, the increased thrust due to acceleration or deceleration automatically increases the friction and consequently increases the damping characteristics of the suspension. The lengths of the arms are so chosen for a vehicle body having a given center of gravity so that the moments of force about the latter due to deceleration of the vehicle and the accompanying torque reactions on the arms are in equilibrium for a determinate deceleration whereby deceleration of the vehicle causes only motion of translation of the body downwardly instead of the usual "nosing down" in automobiles having soft suspensions.

The embodiment of the invention herein shown comprises a pneumatic suspension system having a very desirable rate characteristic without harshness resulting from sudden changes of velocities of non-compressible fluids, but it will be understood that the invention may be used in combination with the conventional liquid shock absorber, preferably adjusted to prevent a "harsh" ride, that is, adjusted so that the resistance of the shock absorber to all normal impacts is not large as compared to the rate of the spring.

Of the accompanying drawings:

Figure 2 is a perspective view of the rear end of an automobile frame and running gear, and showing one embodiment of the improved suspension operatively associated therewith;

Figure 3 is a section taken on the line 3—3 of Figure 4, showing a diametric section of another embodiment of the friction-producing device, which device is universal in operation in that it frictionally resists all relative movements between the running gear and the frame of the vehicle;

Figure 4 is a section on the line 4—4 of Figure 3;

Figure 5 is a view similar to Figure 3 showing a diametric section of another embodiment of universal friction-producing device, taken on line 5—5 of Figure 6;

Figure 6 is a section on the line 6—6 of Figure 5;

Figure 7 is a section on the line 7—7 of Figure 8 of still another embodiment of universal friction-producing device;

Figure 8 is an elevation thereof as viewed from the right of Figure 7;

Figure 9 is a section on the line 9—9 of Figure 7;

Figure 10 is a section on the line 10—10 of Figure 8.

Figure 1:
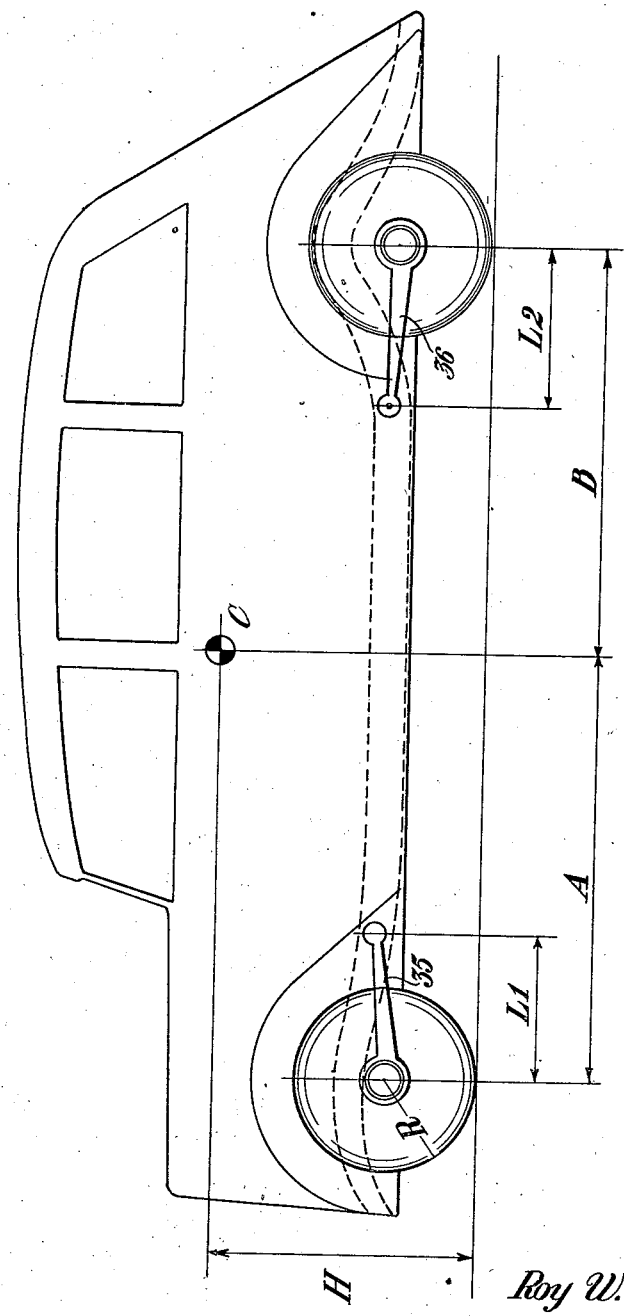
Figure 1 is a somewhat diagrammatic side elevation of an automobile embodying the invention showing an arrangement for maintaining a horizontal position of the body during braking.

Referring now to the drawings, particularly Figure 1 thereof, there is shown a conventional side elevation of an automobile, and indicated thereon are torque rods 35, 36 which rods are connected to the front and rear axles respectively, and to the frame of the vehicle, and constitute the thrust and torque translating elements of a vehicle suspension, other parts of the latter not being shown in this view. Preferably the length ($L_1$ and $L_2$) of the torque rods 35 and 36 is such, and their pivotal connection to the vehicle frame is so disposed with relation to the center of gravity C of the vehicle body that the body is maintained substantially in horizontal position when the brakes are applied, thus obviating the usual "nosing down" that is common in automobiles having soft suspension. The lengths of the torque rods are so related to the rolling radii R of the tires of a vehicle having a given center of gravity C, that the moments of force about the center of gravity produce a condition of equilibrium for the body for a determinate acceleration or deceleration, which acceleration or deceleration may be considered as a standard. The front and rear suspensions are essentially of the same construction, so that only the suspensions at one end of the vehicle need be described in detail. The suspensions at the rear of the vehicle are subject to greater strains than the front suspensions, that is, they are subject to driving torque in addition to braking torque, and for this reason it is the rear suspensions that have been selected for detailed illustration and description.

Referring now to Figure 2 of the drawings, there is shown a vehicle suspension constituting another embodiment of the invention. Shown in the drawings is a vehicle frame 255 including cross braces 256, 256, and running gear comprising a live axle housing 257 including a torque tube 258 enclosing the driving shaft. The frame 255 is supported by the running gear of the vehicle through the agency of a pneumatic suspension system of which bellows members 259, 259 are an operative part. Each bellows 259 is interposed between a side rail of the frame 255, and a torque rod 260 that is pivotally connected at one end to the axle housing 257, adjacent one end of the latter, the other end of said torque rod being pivotally connected to a cross-brace 256, forwardly of the axle housing. Relative movement between each torque rod 260 and the frame 255 is frictionally resisted by a friction connection 261 that is of the universal type. Relative movement between the axle housing 257 and each torque rod 260 is yieldingly resisted by a special pivotal connection therebetween. Although the members 260 are designated "torque rods", the construction is such that they transmit only thrust reactions, torque reactions being taken by the torque tube 258.

The embodiment of the invention shown in Figures 3 and 4 is of the universal type adapted frictionally to resist all relative movement between the frame and the running gear of the vehicle. It comprises a hollow shell or housing consisting of two metal members 104, 105 that are of general cup shape, the member 105 being annular, said members having circumferentially extending marginal flanges 104a, 105a that abut each other in the assembled condition of the housing. The members 104, 105 may be secured to each other by bolts or the like that extend through said flanges, and the latter also may be utilized for mounting the device upon the frame of a vehicle, as will be understood. The interior, circumferential surface of the housing has the shape of the surface of a spherical segment lying between two parallel planes that are equi-distant from the center of the sphere. Positioned interiorly of the housing is a structure that is angularly movable in all directions about the center of the spherical segment. Said structure comprises a disc-like structure comprising two annular metal plates 106, 106 that are disposed in face to face relation, the outer circumferential regions of said plates being formed into oppositely directed lateral flanges 107, 107, and the inner circumference of the plates being formed into oppositely directed lateral flanges 108, 108. The plates 106 are joined to each other as by welding, and are mounted upon an axial spindle 109 to which the flanges 108 are welded, said spindle normally being disposed perpendicular to the plane of the housing flanges 104a, 105a. Exteriorly of the housing the spindle 109 is splined into a bushing 110 carried upon one end of a torque rod 36, and retained therein by a nut 111. The inner circumference of the housing member 105 is provided with a resilient rubber gasket 112 that yieldingly grips the spindle 109 and thus completely closes the interior of the housing at all times and protects the elements therein from grit or moisture.

The flanges 107 of the movable, internal structure are so shaped as to present a transversely concave or grooved periphery, and at four equally spaced points said groove is interrupted by transversely disposed metal blocks 114, 114 having radially inwardly extending projections 114a that are welded into respective transverse slots in said flanges, as best shown in Figure 4. The outermost face of each block 114 is concentric with the spherical surface of the housing, and is in spaced relation thereto. As viewed parallel to the axis of spindle 109, as in Figure 4, the lateral faces of each block 114 are oblique and outwardly divergent. Mounted in the groove defined by the flanges 107, 107, between adjacent blocks 114, are rubber cushions 115, 115, and overlying each cushion is a thick layer of friction material 116 that frictionally engages the spherical inner face of the housing, the rubber cushions being under radially directed compressive stress so as to urge the friction material outwardly at all times. In addition, the rubber cushions 115, 115 serve as insulation between the torque arms 36 and the vehicle body for mechanical vibrations and noise.

The arrangement is such that relative angular movement between the spindle 109 and the housing is frictionally resisted by the movement of the friction material 116 relative to the inner housing surface. The presence of the wedge-shaped blocks 114 between adjacent lengths of friction material 116 and rubber cushions 115 prevents relative movement of said elements circumferentially of the flanges 107. The transverse shape of the latter is such as to prevent relative movement between the aforesaid parts when the axis of the spindle 109 is tilted angularly with relation to the housing.

The embodiment of the invention shown in Figures 5 and 6 also is of the universal type just described. It comprises a housing consisting of a hemispherical shell 120, and a cover member 121 secured thereto by cap screws 122, 122. The cover 121 is somewhat dished so that the space within the housing is somewhat greater than the volume of the shell 120. The cover also is annular in form, its inner circumference being formed with an inwardly extending flange or sleeve 123, the inner end of the latter being radially outwardly flared to provide an end-flange 124. The housing may be connected to a radially disposed torque rod by means of cap screws 125. Extending into the interior of the housing, coaxially of sleeve 123, is a spindle 126 that has its outer end splined into a bushing 127 that is secured to the bracket 43 carried by the vehicle frame, the spindle being retained in said bushing by a nut 128. Mounted upon the inner end of the spindle 126 is a hemispherical sheet metal shell 129 that is concentric with relation to the outer shell 120 and is in spaced relation thereto. Mounted between the shells 120, 129 is a layer of friction material 130 which is preferably attached to the inner shell 129 by means of a layer of rubber which is chemically and mechanically connected both to the shell and the layer of friction material. The friction material is preferably impregnated with a substance to provide lubrication for substantially the life of the friction device and is made by calendering a layer of unvulcanized rubber composition onto one side of fabric material such as cotton duck, or webbing. The calendering forces the rubber through the fabric structure to provide a mechanical bond as well as a chemical bond, when the rubber is vulcanized. The other side of the fabric material is left devoid of unvulcanized rubber composition and is impregnated with a substance comprising colloidal graphite suspended in castor oil. The capillary action between the fibers of the material causes the colloidal graphite suspension to fill all of the interstices and serves as a supply of lubricant for the friction material for substantially the full life of the friction device. The rubber layer of the friction material is then vulcanized to the inner shell 129, which has a plurality of apertures 131 with which the rubber layer forms a mechanical interlock in addition to the chemical bond throughout the contacting surfaces of the metallic shell 129 and the rubber. The spherical profile of the friction facing 130 may have a flat region 132 opposite the end of spindle 126, thus providing a closed recess between the outer shell and the friction material to form a pocket for some of the graphite and oil mixture. Glycerine, mineral oils, or animal fat oils in which colloidal graphite has been suspended, may be used instead of the castor oil-graphite composition described above.

The friction material above described has a coefficient of kinetic friction greater than its coefficient of static friction. This feature greatly improves the damping characteristic of the friction device for improving the riding characteristics of a vehicle, because the frictional force increases as relative movement begins. Since the friction is at least as great after movement begins as before it begins, the sudden "break-away" noises and vibrations are eliminated without reducing the damping factor. The method of attaching through the rubber backing layer compensates for any inaccuracies in the metal parts and permits the use of stamped metal parts.

Vulcanized to the inner circumference of cover-sleeve 123 is a bushing 134 of resilient rubber composition, which bushing is of smaller inside diameter than the spindle 126, and is placed under compressive radial strain by the latter. The bushing 134 extends onto flange 124 of the said sleeve, and has an annular portion 134a that surrounds the spindle in spaced relation thereto, and engages the concave face of the inner shell 129. When the various elements of the coupling are assembled as shown, the portion 134a of the bushing 134 is put under compressive strain, with the result that it strongly urges the inner shell 129 axially toward the outer shell 120. Thus the friction material 130 always has good frictional contact with the inner surface of the outer shell, and frictionally will resist relative movement, both angular and torsional, between said shells in any direction arising from relative movement between the vehicle frame and its running gear.

The embodiment of the invention shown in Figures 7 to 10 is a further development of the universal type connection between the frame and a torque rod of a vehicle. It comprises an axial spindle 166 that has one of its ends mounted in a bushing 167 on the bracket 43 on the vehicle frame and secured therein by a nut 168. Fixedly mounted upon the other end of spindle 166 is a hemispherical metal shell 169 that has a facing of resilient rubber composition 170 vulcanized to its inner or concave face, and has a similar layer of rubber 171 vulcanized to its outer or convex face, said rubber layers covering all of the shell face, except a region around the axis thereof, where the spindle 166 is connected to the shell. Bonded to said rubber layers 170, 171 are respective facings 172, 173 of friction material of the preferred type employed in the previously described embodiments of the invention. The shell 169 is positioned within a housing comprising a concentrically disposed, generally hemispherical outer shell 176, and the open side of the latter is provided with an annular cover plate 177 that is permanently secured thereto as by marginal welding. The space within the housing is greater than the hemispherical volume of the shell 176 so as to permit angular movement of the shell 169 therein. The inner circumference of the cover plate 177 is formed with an inwardly extending flange 177a, and abutting the end of the latter, interiorly of the housing, is a rubber gasket or oil seal 178 that closely encircles the spindle 166, for the purpose of retaining lubricant within the housing and for excluding dust and grit therefrom. A thin, annular, sheet metal retaining ring 179 embraces the flange 177a and gasket 178 for retaining the latter in place at the end of said flange. The gasket 178 is so positioned with relation to the spindle 166 that the center of oscillation of the latter lies within the plane of said gasket, whereby oscillation of the spindle is effected with minimum distortion of the gasket. The friction facing 173 on the convex side of the shell 169 engages the concave face of the outer shell 176 as shown.

Also positioned within the housing is a load member 181 of cast metal that is annular in form, its outer surface having the shape of a spherical segment lying between two parallel planes on the same side of its center, said spherical surface bearing against the friction material 172 on the concave side of shell 169. Positioned concentrically of the spindle 166 is a conical coiled compression spring 182, the large end of which bears against the inner wall of load member 181 and the small end of which bears against a lateral face of retaining ring 179, the primary purpose of said spring being to hold the retaining ring in place. The outer shell 176 is arranged to be turned angularly and oscillated relatively of the inner shell 169, and to this end a torque rod 36 is connected to the housing by means of bolts 184, the housing being provided with suitable boltholes 185, 185 to receive said bolts. Movement of the outer shell 176 relatively of the inner shell 169 imparts a similar movement to the load member 181 whereby the latter moves relatively of said inner shell. To this end a cushioned connection is provided between the housing cover 177 and said load member, and adjustable expansible means also is provided between said cover and load member for urging the latter and the outer shell 176 toward each other, against the intervening inner shell, whereby the friction between said members may be varied as desired.

The cushioned connection between the housing and the load member 181 comprises a driving element 188 that is welded or otherwise secured to the inner face of the housing cover 177, said driving element having a plurality of outstanding ribs or lugs 188a, 188a that extend toward the load member 181, the medial rib 188a of the group being radial with relation to the axis of the housing and the other ribs being parallel to said medial rib. The ribs 188a are in intercalated relation to a plurality of similarly disposed ribs or lugs 181a, 181a formed in the adjacent load member 181, but in spaced relation thereto to accommodate an intervening cushion 189 of resilient rubber composition of sinuous form. Integral rubber lugs 189a, 189a on said cushion are received in respective bores or recesses 190 in the load member for retaining said cushion in proper position between the two sets of ribs.

The expansible means between the housing and the load member 181 comprises a pair of helical compression springs 192, each of which has one end in engagement with said load member and has its other end in engagement with an end portion of an arcuate plate 193. The latter is adjustable toward and from the housing cover 177 by means of a pair of set screws 194, 194 that are threaded through the plate 193, axially of the respective springs 192, the inner end of each screw being provided with a smooth, cylindrical pilot 195 that is slidably disposed within a bore 196 in the load member, the arrangement being such as to provide lateral stability to the spring assembly. The outer end of each screw 194 has a head that is frusto-conical on its end and seats within a similarly shaped recess in the inner face of the cover plate 177, said depression being formed with an aperture 197, and the screw head being formed with a polygonal socket for receiving a suitable wrench that is inserted therein through the aperture 197. A locking screw 198, Figure 10, similar to the screws aforementioned, is threaded through the plate 193 midway between screws 194 for the purpose of securing the plate in adjusted position. The end of the screw 198 is adapted to be screwed down and abut against the outer face of the plate 193, to increase the pressure on the threads of the screws 194, thereby provide a frictional lock between the latter and the plate 193. The locking screw 198 is accessible from the exterior of the housing through a third aperture 197, in the same manner as screws 194. The expansible means described is disposed in the housing substantially diametrically opposite the driving element 188, so that the rubber cushion 189 cooperates with springs 192 in yieldingly urging load member 181 and the outer shell 176 toward each other. The arrangement is such that said load member and outer shell move in unison, relatively of the inner shell 169, upon movement of the torque rod 36 relatively of the frame of the vehicle, the friction material 172, 173 resisting said relative movement determinately according to the pressure exerted by the expansible means in the structure.

It will be seen that applicant has provided a vehicle suspension system of the pneumatic type wherein there is controllable friction, with resulting improvement of the riding qualities of the vehicle. By mounting the bellows on the torque rods intermediate the ends of the latter, which are connected, respectively, to the axle housing and to the frame or body through the universal movement friction devices, the latter supports a part of the vehicle body weight, and impact forces upwardly on the wheels automatically increase the frictional contact in the friction device to increase the frictional resistance to relative oscillations between the running gear and body or frame. The invention provides stability to the vehicle body while maintaining the desirable low rate of the suspension at normal driving conditions, and achieves the other advantages set out in the foregoing statement of objects.

Other modification may be resorted to without departing from the spirit of the invention, or the scope thereof as defined by the appended claims.

What is claimed is:

1. In a device for frictionally resisting relative movement between two members, the combination of a spindle fixed to one of said members, an annular housing concentric with said spindle in spaced relation thereto fixed to the other of said members, the perimeter of said housing having the shape of a spherical sector lying between parallel planes that are normal to the axis of said spindle, a disc-like structure secured upon said spindle and extending radially therefrom in the medial plane of the housing, the perimeter of said structure comprising a groove, a body of resilient rubber under compressive stress in the bottom of said groove, and a body of friction material between the adjacent housing wall and said rubber and yieldingly urged by the latter into frictional engagement with said housing wall.

2. In a device for frictionally resisting relative movement between two members, the combination of a spindle fixed to one of the members, an annular housing concentric with said spindle in spaced relation thereto fixed to the other of said members, the perimeter of said housing having the shape of a spherical sector lying between parallel planes that are normal to the axis of said spindle, a disc-like structure secured upon said spindle and extending radially thereof in the medial plane of the housing, the perimeter of said structure comprising oppositely extending lateral flanges defining a circumferential groove, partitions extending transversely of said groove at spaced points, said portions having outwardly divergent lateral faces, respective layers of resilient rubber in the bottom of said groove between partitions, and respective bodies of friction material disposed between said rubber and the adjacent wall of the housing, said rubber being under radial compression and yieldingly urging the friction bodies against said housing wall.

3. In a device for frictionally resisting relative movement between two members, the combination of a spindle fixed to one of said members, a housing comprising a hemispherical shell and an annular closure plate secured to the other of said members, said spindle extending into said housing through an axial opening in the closure plate thereof, a hemispherical inner shell mounted upon the free end of said spindle concentrically with relation to the housing shell, a layer of friction material disposed between said shells and secured to the inner shell, and yielding means urging said shells toward each other, axially of the spindle, to provide strong frictional engagement of the friction material and said outer shell.

4. In a device for frictionally resisting relative movement between two members, the combination of a spindle fixed to one of said members, a housing comprising a hemispherical shell and an annular closure plate secured to the other of said members, said spindle extending into the housing through an axial opening in the closure plate, the latter having an integral axial sleeve extending into the housing concentrically of said spindle, a hemispherical inner shell mounted upon the free end of said spindle concentrically with relation to the housing shell, a layer of friction material secured to the convex face of the inner shell, and a tubular bushing of rubber composition under compressive stress interposed between the spindle and the circumscribing sleeve to close the opening thereat, said bushing extending axially, in spaced relation to the spindle, into engagement with the concave face of the inner shell for yieldingly urging the latter and the outer shell against the friction material therebetween.

5. In a device for frictionally resisting relative movement between two members, the combination of a spindle fixed to one of said members, a housing comprising a hemispherical shell and an annular closure plate secured to the other of said members, said spindle extending into the housing through an axial opening in the closure plate thereof, a hemispherical inner shell mounted upon the free end of said spindle, a layer of friction material disposed between said shells and secured to one of them, yielding means urging said shells toward each other to provide strong frictional engagement of the friction material with said outer shell, and means for varying the force of said yielding means, accessible from the exterior of the housing.

6. In a device for frictionally resisting relative movement between two members, the combination of a spindle fixed to one of said members, a housing comprising a hemispherical shell and an annular closure plate secured to the other of said members, said spindle extending into the housing through an axial opening in the closure plate thereof, a hemispherical inner shell mounted upon the free end of said spindle, a layer of friction material disposed between said shells and secured to one of them, a coiled compression spring concentric with the spindle engaging the concave side of the inner shell, a backing member for said yielding means, and means accessible from the exterior of said housing and engaging the closure thereof for moving said backing member axially with relation to the spindle for varying the force of said spring.

7. In a device for frictionally resisting relative movement between two members, the combination of a concavo-convex member, facings of friction material upon the concave face and the convex face thereof, an outer member enclosing said concavo-convex member and having a concave face in contact with the friction facing on the convex face thereof, an inner member having a convex face in contact with the friction facing on the concave face thereof, yielding means urging the outer member and the inner member toward each other to provide good frictional engagement with the friction facings on the concavo-convex member, means for connecting the concavo-convex member to one of the relatively movable members, and means for connecting the inner and outer members to the other relatively movable member.

8. A combination as defined in claim 7 including means for varying the pressure of said yielding means for the purpose of varying the friction between relatively movable members.

9. In a device for frictionally resisting relative movement between two members, the combination of a spindle fixed to one of said members, a hemispherical shell mounted upon the free end of said spindle, facings of friction material on the convex and on the concave faces of said shell, a housing mounted upon the other relatively movable member, said housing comprising a hemispherical outer shell and an annular closure plate, the spindle extending through an axial aperture of the latter and the friction facing on the convex side of the inner shell being in contact with the concave face of the outer shell, an annular load member within the housing, concentrically of the spindle, having a convex face in contact with the friction material on the concave face of the shell, means for supporting the load member on the housing, and yielding means interposed between the load member and housing for urging the load member and outer shell toward the inner shell.

10. A combination as defined in claim 9 in which the means for supporting the load member upon the housing is resilient.

11. In a device for frictionally resisting relative movement between two members, the combination of a spindle fixed to one of said members, a housing comprising a hollow shell and annular inclosure means therefor secured to the other of said members, said spindle extending into said housing through an axial opening in the enclosure means thereof, a layer of friction material mounted on a support which in turn is mounted on the free end of said spindle, said friction material facing the inside surface of said shell and being mounted concentric therewith, and yielding means yieldable in all directions urging said friction material toward said inside surface of said shell, whereby strong frictional engagement of the friction material and the shell is provided.

ROY W. BROWN.